Patented Sept. 19, 1950

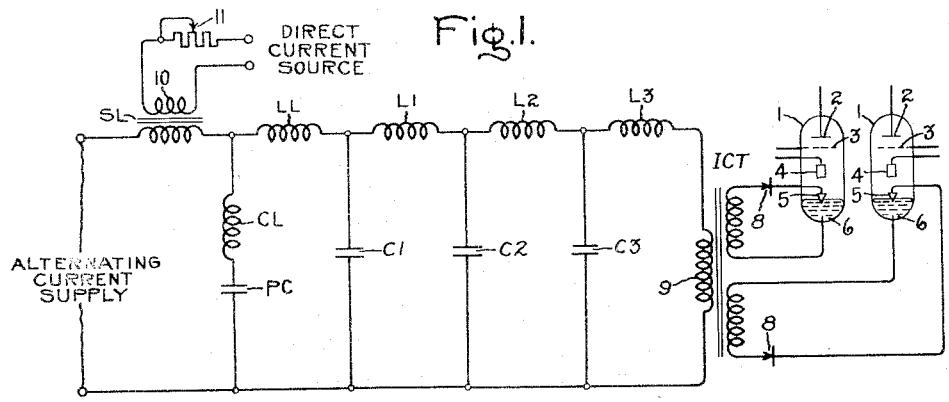
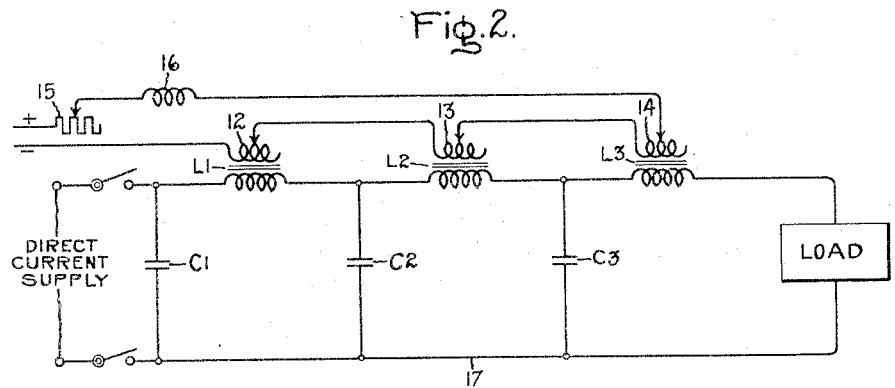
Inventors:
Harry L. Kellogg,
Burnice D. Bedford,
by Ernest C. Britton
Their Attorney.

2,523,027

UNITED STATES PATENT OFFICE 2,523,027

METHOD AND APPARATUS FOR EFFECTING ELECTRIC POWER TRANSFORMATION

Harry L. Kellogg, Schenectady, and Burnice D. Bedford, Scotia, N. Y., assignors to General Electric Company, a corporation of New York Application January 20, 1950, Serial No. 139,681

12 Claims. (Cl. 315—274)

This invention relates to a method and apparatus for effecting power transformation and more particularly to a circuit for progressively changing the rate of flow of coulombs so that a particular electric current as measured in amperes can be progressively changed in value without materially altering the driving voltage so that substantial changes in the rate of flow of energy or power may be effected.

The physical size of electric apparatus used, for example, in known control circuits frequently must be relatively large in order to minimize the electrical losses in such circuits. The excitation circuits used in conjunction with power electronic devices are an example wherein it would be desirable to effect substantial reductions in the physical size, weight and cost of the circuit components. Furthermore, it would be desirable to reduce the energy losses in such circuits.

An object of our invention is to provide an efficient power transformation circuit whereby the desired amount of power is delivered to a load circuit in cases where the power at the source of energy is not suitable for direct application to the load circuit.

Another object of our invention is the provision of circuit means to be interposed between a source of energy and a load circuit for effecting substantial changes between the power available at the supply and that required by the load.

Still another object of our invention is to provide circuit means for effecting substantial changes in the rate of flow of coulombs without materially altering the driving voltage thereby to effect a transformation of power.

A further object of our invention is the provision of means for progressively increasing the rate of flow of energy so as to produce a substantial increase in the power or rate of energy dissipation to a load circuit where the source of supply of energy is not suitable for producing the required power.

A still further object of our invention is to provide means for supplying power of a relatively large magnitude for a relatively short length of time to a load from a source of energy which is adapted to deliver power of a relatively low magnitude for a relatively long time.

Still another object of our invention is to provide an improved impulse producing circuit for use in conjunction with electronic devices such as ignitron tubes.

A still further object of our invention is the provision of an improved method for effecting electric power transformation.

In accordance with one aspect of our invention, a load circuit requiring a relatively high rate of flow of energy is supplied from a source which is adapted to produce a lower rate of flow of energy by utilizing means which progressively increases the flow of coulombs per unit of time without materially diminishing the driving voltage. In its essential features, our invention comprises a first energy storage means, a first shunt circuit for such storage means which circuit itself includes energy storage means and reactance means arranged to control the rate of discharge of the first energy storage means, and a second circuit in shunt with the energy storage means of the first shunt circuit and comprising reactance means, the reactance means of said shunt circuits being constructed to allow conduction of current at different rates.

For a better understanding of our invention, reference may be had to the accompanying drawings, in which Fig. 1 represents the invention as embodied in an excitation circuit for an electronic device of the ignitron type, and in which Fig. 2 represents a more general application of the invention. Although the invention is shown in Fig. 1 as being applied in conjunction with an igniter firing circuit for ignitron tubes, it will be understood that the invention would be applicable to other circuits as well, such, for example, as the starting circuit for gas-filled tubes used in connection with neon and fluorescent lamps and also could be utilized to energize intermittently a source of stroboscopic light.

With reference to Fig. 1, the numeral 1 represents the enclosing envelopes of a pair of electric discharge tubes of the ignitron type. These tubes are each provided with a plate element 2, a grid element 3, a holding anode 4, an igniter 5 and a mercury pool cathode 6. The igniters 5 are energized from the secondary winding 7 of the igniter coupling transformer ICT. Unidirectional conducting devices 8 are arranged so that the two ignitrons illustrated will function as a full-wave rectifier.

The primary winding 9 of transformer ICT is energized from the alternating current supply source indicated through reactors SL, linear reactor LL, and through the circuit comprising saturable reactors L1, L2 and L3 and capacitors C1, C2 and C3. The reactor CL and capacitor PC are chosen to obtain the desired power factor and to obtain suitable wave shape in accordance with known principles. The phase shifting reactor SL is provided with a control winding 10 supplied from a source of direct current through a variable resistor 11. As is well known, the value of direct current supplied to control winding 10 will determine the phase shift performed by the phase shifting reactor SL. The reactors L1, L2 and L3 and capacitors C1, C2 and C3 are arranged to accumulate energy from the supply source and subsequently to discharge such energy at a progressively faster and faster rate so that the power available to operate the igniters 5 becomes substantially greater than the power available from the output terminals of the alternating current supply. This increased power inherently produced by the arrangement of our invention makes possible the use of smaller circuit components and also makes possible the application of a large amount of power for a short interval of time so that igniters of the so-called ceramic type can be operated by our invention. By ceramic igniters, we mean igniters of the type wherein a hollow tubular ceramic element extends through the bottom end of each of the envelopes 1 and to a level above the surface of the mercury pool 6 and wherein a conducting element is disposed within the hollow portion of the ceramic tubular element. Thus, the voltage stress is applied through the ceramic material which ordinarily has a high dielectric strength and is applied between the electrode disposed with the ceramic tube and the mercury pool itself. Obviously, the rate of change of voltage required to establish a cathode spot is greater where the ceramic type igniter is used than in applications using the more common immersion type igniter illustrated at 5 in Fig. 1.

This increase in power or concentration of energy flow into a short space of time is possible in accordance with our invention because the voltage rating and the impedance of the saturable reactors L1, L2 and L3 is such after these reactors are saturated that reactor L2 has a smaller reactance when saturated than reactor L1, and reactor L3 has a smaller value of reactance when saturated than does reactor L2 when saturated. Thus when a signal is supplied from the alternating current source, a charge accumulates on capacitor C1 at a relatively slow rate. The voltage developed across C1 causes the flux in reactor L1 to increase and after a period of time reactor L2 saturates and the charge from C1 quickly passes to capacitor C2. Subsequently, capacitor C2 discharges through reactor L2 and into capacitor C3 but at a rate faster than the discharge of capacitor C1 into capacitor C2 through reactor L1 because the value of reactance of reactor L2 when saturated is substantially less than the value of reactance of reactor L1 when saturated. Likewise, the discharge of capacitor C3 through saturable reactor L3 and the primary winding of igniter coupling transformer ICT is at a rate considerably faster than the rate of discharge from capacitor C2 to capacitor C3. This, of course, is due to the fact that the saturated reactance of reactor L3 is of a lower order of magnitude than the reactance of reactor L2 when saturated. Since the rate of discharge of capacitor C3 is much faster than the rate at which energy can be supplied from the alternating current source, the peak value of coulombs per second supplied through primary winding 9 of transformer ICT is much higher than the amperes of current which can be drawn from the alternating current supply. Since the voltage which drives the current through primary winding 9 of transformer ICT is not appreciably reduced below the value of voltage available at the alternating current source, the peak power supplied to primary winding 9 is substantially greater than the peak power which can be drawn from the alternating current supply due to the large increase in amperes of current supplied to primary winding 9. Thus for a short time, an impulse of a greater rate of energy dissipation is available to the ignitor 5 than with conventional igniter firing circuits.

It will be obvious that the saturable reactors L1, L2 and L3 could be replaced by other known non-linear impedance means such, for example, as glow tubes of the gaseous discharge type.

As already pointed out, our invention is not limited in its application to the excitation circuit shown in Fig. 1 but can be utilized in conjunction with other types of load circuits where a large amount of energy is required for a short period of time. In Fig. 2, a circuit embodying our invention is shown as being energized from a direct current source and the load is schematically represented. Whether alternating current or direct current energy is supplied to the circuit comprising our invention, the principles thereof remain the same so that with the arrangement of Fig. 2 the saturable reactor L2 would have a value of reactance when saturated which would be less than the value of reactance of saturable reactor L1 when saturated and likewise the value of reactance for reactor L3 when saturated would be substantially less than the value of reactance of reactor L2 when saturated. If desired and as is indicated in Fig. 2, the reactors L1, L2 and L3 could be provided respectively with control windings 12, 13 and 14 for determining the degree of presaturation of these reactors. These control windings could be energized in known manner from a source of direct current through an adjustable resistance 15 and an impedance 16 and the impedance of the control windings could be individually adjustable as is indicated. In this manner, the action of the circuit could be adjusted as desired so as to achieve within limits any desired change in current flow.

While the various capacitors C1, C2 and C3 shown in Figs. 1 and 2 for most purposes can be of the same voltage and capacitance rating, it may be desirable for certain purposes to increase the capacitance of C2 to such an extent that its capacity is greater than capacitor C1 and to construct capacitor C3 so that its capacity is greater than that of capacitor C2 in order that the relatively small energy losses incurred may be minimized.

The arrangement shown in Figs. 1 and 2 and as described above is adapted to increase the concentration of energy flow. It is obvious, however, that for certain applications it may be desirable to decrease the value of power available to a particular load from a particular source of energy. To this end and with reference to Fig. 2, it would only be necessary to arrange the reactors L1, L2 and L3 so that the saturated reactance of these elements would be progressively greater for the elements progressively nearer the load. In this way, the rate of flow of coulombs would be decreased and the rate of energy flow at the load reduced. While the connections of the reactors L1, L2 and L3 for most applications would be as is shown, it would be possible to connect one or more of these components in series with the conductor 17. For example, the main winding of reactor L1 could be connected in that portion of conductor 17 which interconnects the lower terminals of capacitors C1 and C2, and the operation of the circuit would not be affected.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. In combination, a source of electric energy, first energy storage means energized from said source, a first shunt circuit including second energy storage means and current control means arranged in series with respect to each other and connected in parallel with said first energy storage means, a second shunt circuit including current control means in parallel with said second energy storage means, each of said current control means being effective to cause its parallel connected energy storage means to discharge at a predetermined rate such that the rates of discharge of said first and said second energy storage means are different.

2. In combination, a source of electric energy, first energy storage means energized from said source, a first shunt circuit including second energy storage means and current control means arranged in series with respect to each other and connected in parallel with said first energy storage means, a second shunt circuit including current control means in parallel with said second energy storage means, each of said current control means being saturable and having values of reactance when saturated such that said second energy storage means is discharged at an appreciably faster rate than said first energy storage means.

3. In combination, a source of electric energy, first energy storage means energized from said source, a first shunt circuit including second energy storage means and saturable reactance means arranged in series with respect to each other and connected in parallel with said first energy storage means, a second shunt circuit including saturable reactance means in parallel with said second energy storage means, said reactance means having different values of reactance when saturated.

4. In combination, a source of electric energy, first capacitance means energized from said source, a first shunt circuit comprising a second capacitance means and a saturable reactor in series with said second capacitance means, said first shunt circuit being in parallel with said first capacitance means, and a second shunt circuit comprising a saturable reactor in parallel with said second capacitance means, the impedance of the reactor in said second shunt circuit being substantially less than the impedance of the reactor in said first shunt circuit when said reactors are saturated.

5. An arrangement for effecting an increase in the magnitude of electric power available to a load circuit from a preselected source of electric energy comprising first capacitance means energized from said source, a shunt circuit including a second capacitance means and a first saturable reactor, said shunt circuit being in parallel with said first capacitance means, a second saturable reactor in series with the load, said second reactor and the load being connected across said second capacitance means, the saturated reactance of said second reactor being substantially less than the saturated reactance of said first reactor.

6. An arrangement for effecting an increase in the magnitude of electric power available to a load circuit from a preselected source of electric energy comprising a pair of saturable reactors arranged in series and interconnected between one terminal of said source and one terminal of said load, the reactance of the one of said reactors nearer said source being higher than the reactance of the other of said reactors both when said reactors are saturated and when said reactors are not saturated, and capacitance means for each of said reactors, each of said capacitance means having one terminal thereof connected to a terminal of said source and of said load other than the terminals to which said reactors are connected and the other terminal connected to the source terminal of its associated reactor.

7. An arrangement for effecting an increase in the time rate of dissipation of electric energy supplied to a load circuit from a preselected source of electric energy comprising a plurality of saturable reactors arranged in series and connected in the line between one terminal of said source and one terminal of said load, said reactors having different values of reactance when saturated and being arranged so that the reactor having the largest value of reactance when saturated is nearest said source and so that the other reactors have values of reactance when saturated which are progressively smaller for reactors nearer and nearer said load, and a capacitor for each of said reactors, each of said capacitors having one terminal thereof connected to a terminal of said source and of said load other than the terminal to which said reactors are connected and the other terminal thereof connected to the source terminal of its associated reactor.

8. An arrangement for effecting an increase in the time rate of dissipation of electric energy supplied to a load circuit from a preselected source of electric energy comprising a plurality of saturable reactors arranged in series and connected in the line between one terminal of said source and one terminal of said load, said reactors having different values of reactance both when saturated and when unsaturated and being arranged so that the reactor having the largest value of reactance is nearest said source and so that the other reactors have values of reactance which are progressively smaller for reactors nearer and nearer said load, and a capacitance means for each of said reactors, each of said capacitance means having one terminal thereof connected to a terminal of said load and of said source other than the terminals between which said reactors are interconnected and the other terminal thereof connected to the source terminal of its associated reactor.

9. In combination, an electric discharge device of the type employing an enclosing envelope and comprising therein an ionizable medium, a cathode, an igniter for initiating electron emission at said cathode, a source of electric energy, a transformer having a secondary winding connected to energize said igniter, a plurality of saturable reactors arranged in series and connected in the line between one terminal of said source and one terminal of the primary winding of said transformer, said reactors having different values of reactance when saturated and being arranged so that the reactor having the largest value of reactance when saturated is nearest said source and so that the other reactors have values of reactance when saturated which are progressively smaller for reactors progressively nearer said primary winding, and capacitance means for each of said reactors, each of said capacitance means having one terminal thereof connected to a terminal of said primary winding and of said source other than the terminal to which said reactors are connected and the other terminal thereof connected to the source terminal of its associated reactor.

10. A method for effecting changes in the magnitude of power available to a load circuit from a preselected source of electric energy comprising accumulating an electric charge from said source, effecting the discharge of said charge after a predetermined accumulation thereof, accumulating the energy of said discharge, and subsequently discharging such energy to the load circuit at a rate different than the rate of discharge of said charge.

11. A method for increasing the magnitude of power available to a preselected load circuit from a preselected source of electric energy comprising accumulating an electric charge from said source, effecting the discharge of said charge, accumulating the energy of said discharge, and subsequently discharging such energy to the load circuit at a rate faster than the rate of discharge of said charge.

12. A method for increasing the magnitude of power available to a load circuit from a preselected source of electric energy comprising accumulating an electric charge from said source, effecting the discharge of said charge, accumulating the energy of said discharge, and subsequently discharging such energy to the load circuit at a rate faster than the rate of discharge of said charge without materially reducing the magnitude of the voltage applied to the load below the value of the voltage of said source.

HARRY L. KELLOGG.
BURNICE D. BEDFORD.

No references cited.